United States Patent
Ikeda et al.

(10) Patent No.: US 11,142,255 B2
(45) Date of Patent: Oct. 12, 2021

(54) PILLAR STRUCTURE FOR VEHICLE

(71) Applicant: TOYOTA JIDOSHA KABUSHIKI KAISHA, Aichi-ken (JP)

(72) Inventors: Koki Ikeda, Toyota (JP); Shinya Kamimura, Toyota (JP); Yoshiki Miyamoto, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 85 days.

(21) Appl. No.: 16/662,024

(22) Filed: Oct. 24, 2019

(65) Prior Publication Data

US 2020/0148274 A1 May 14, 2020

(30) Foreign Application Priority Data

Nov. 13, 2018 (JP) .............................. JP2018-213294

(51) Int. Cl.
*B62D 25/04* (2006.01)
(52) U.S. Cl.
CPC .................................... *B62D 25/04* (2013.01)
(58) Field of Classification Search
CPC .............................. B62D 25/04; B60R 13/025
USPC ................................. 296/193.06, 39.1, 1.08
See application file for complete search history.

(56) References Cited

U.S. PATENT DOCUMENTS

| 5,741,044 A | 4/1998 | Kawai et al. |
| 2015/0284028 A1* | 10/2015 | Yamada ................. B62D 25/06 403/272 |
| 2016/0368447 A1* | 12/2016 | Sakurai ............... B60R 13/0206 |
| 2016/0368537 A1 | 12/2016 | Toyota |

FOREIGN PATENT DOCUMENTS

| DE | 4329050 | * | 3/1995 |
| EP | 2631158 A1 | | 8/2013 |
| JP | 2017-7509 A | | 1/2017 |
| JP | 2018-99988 A | | 6/2018 |
| WO | 2009001910 A1 | | 12/2008 |

* cited by examiner

*Primary Examiner* — Dennis H Pedder
(74) *Attorney, Agent, or Firm* — Hauptman Ham, LLP (57) ABSTRACT

There is provided a pillar structure for a vehicle, that has: a pillar frame member having a superposed portion, at which a second wall portion, which faces a vehicle cabin side, of a second member that extends in a length direction of a pillar is superposed with a first wall portion, which faces the vehicle cabin side, of a first member that extends in the length direction of the pillar, and linearly welded portions that are formed due to an edge end portion of the second wall portion being linearly welded to the first wall portion; and a pillar garnish that is mounted at least to the second wall portion, and covers the first wall portion and the second wall portion from the vehicle cabin side.

7 Claims, 6 Drawing Sheets

PILLAR STRUCTURE FOR VEHICLE

CROSS-REFERENCE TO RELATED APPLICATION

This application is based on and claims priority under 35 USC 119 from Japanese Patent Application No. 2018-213294 filed on Nov. 13, 2018, the disclosure of which is incorporated by reference herein.

BACKGROUND

Technical Field

The present disclosure relates to a pillar structure for a vehicle.

Related Art

There is conventionally known a pillar garnish structure in which the visual field of the driver is ensured due to the pair of end wall portions at a pillar garnish that is U-shaped in cross-section being disposed so as to run along directions heading from the eye points toward the front pillar (see, for example, Japanese Patent Application Laid-Open (JP-A) No. 2018-99988).

However, other than designing the structure (the shape) of the pillar garnish itself in order to narrow the front pillar, it has been thought to design the structure (the shape) of the frame member with which the pillar garnish is assembled, and there is still room for improvement with regard to this point.

SUMMARY

Thus, an object of the present disclosure is to provide a pillar structure for a vehicle in which narrowing of a pillar is devised.

In order to achieve the above-described object, a pillar structure for a vehicle of a first aspect of the present disclosure has: a pillar frame member having a superposed portion, at which a second wall portion, which faces a vehicle cabin side, of a second member that extends in a length direction of a pillar, is superposed on a first wall portion, which faces the vehicle cabin side, of a first member that extends in the length direction of the pillar, and having linearly welded portions that are formed by an edge end portion of the second wall portion being linearly welded to the first wall portion; and a pillar garnish that is mounted to the second wall portion, and that covers the first wall portion and the second wall portion from the vehicle cabin side.

In accordance with the first aspect of the present disclosure, the second wall portion, which faces the vehicle cabin side, of the second member that extends in the length direction of the pillar and structures a pillar frame member, is superposed with a first wall portion, which faces the vehicle cabin side, of the first member that extends in the length direction of the pillar and structures a pillar frame member. The edge end portion of this superposed second wall portion is welded in a linear form to the first wall portion. Moreover, the pillar garnish that covers the first wall portion and the second wall portion from the vehicle cabin side is mounted at least to the second wall portion. Accordingly, as compared with a case in which the first wall portion and the second wall portion are not superposed together, and further, the pillar garnish is mounted to a portion other than the first wall portion or the second wall portion, optimization of the assembly space of the pillar garnish at the pillar frame members (space saving) is devised. Accordingly, narrowing of the pillar frame members is devised, and, as a result, narrowing of the pillar is devised.

A pillar structure for a vehicle of a second aspect of the present disclosure is the pillar structure for a vehicle of the first aspect, wherein: anchor members are provided so as to project outward from a wall surface of the pillar garnish, the wall surface facing the first wall portion and the second wall portion, and the pillar garnish is mounted to the second wall portion by the anchor members being inserted into through-holes that are formed in the second wall portion.

In accordance with the second aspect of the present disclosure, the pillar garnish is mounted to the second wall portion due to the anchor members being inserted in the through-holes that are formed at least in the second wall portion. Accordingly, the distances between the linearly welded portions and the through-holes in the direction orthogonal to the length direction of the pillar can be shortened, as compared with a case in which through-holes for insertion of the anchor members of the pillar garnish are formed in a portion other than the first wall portion or the second wall portion. Accordingly, narrowing of the pillar frame members is promoted.

A pillar structure for a vehicle of a third aspect of the present disclosure is the pillar structure for a vehicle of the second aspect, wherein the linearly welded portions are formed intermittently, and the through-holes are formed between the linearly welded portions.

In accordance with the third aspect of the present disclosure, the linearly welded portions are formed intermittently, and the through-holes are formed between the linearly welded portions. Accordingly, the distances between the linearly welded portions and the through-holes in the direction orthogonal to the length direction of the pillar can be shortened, as compared with a case in which the through-holes are not formed between the linearly welded portions that are formed intermittently. Accordingly, narrowing of the pillar frame members is promoted.

A pillar structure for a vehicle of a fourth aspect of the present disclosure is the pillar structure for a vehicle of the third aspect, wherein overhanging portions that jut outward from the edge end portion are formed at the second wall portion between the linearly welded portions, and the through-holes are formed in the overhanging portions.

In accordance with the fourth aspect of the present disclosure, the through-holes are formed in the overhanging portions that jut outward from the edge end portion of the second wall portion between the linearly welded portions. Accordingly, the distances between the linearly welded portions and the through-holes in the direction orthogonal to the length direction of the pillar can be shortened, as compared with a case in which the overhanging portions are not formed in the edge end portion of the second wall portion between the linearly welded portions. Accordingly, narrowing of the pillar frame members is promoted.

A pillar structure for a vehicle of a fifth aspect of the present disclosure is the pillar structure for a vehicle of the third or fourth aspect, wherein the through-holes are formed on an imaginary extension line that connects the linearly welded portions together.

In accordance with the fifth aspect of the present disclosure, the through-holes are formed on an imaginary extension line that connects the linearly welded portions together. Accordingly, the distances between the linearly welded portions and the through-holes in the direction orthogonal to the length direction of the pillar can be shortened, as compared with a case in which the through-holes are formed at positions away from an imaginary extension line that connects the linearly welded portions together. Accordingly, narrowing of the pillar frame members is promoted.

A pillar structure for a vehicle of a sixth aspect of the present disclosure is the pillar structure for a vehicle of any one of the first through fifth aspects, wherein, as seen in a plan sectional view, the pillar garnish is formed in a substantial U-shape that opens toward a vehicle outer side.

In accordance with the sixth aspect of the present disclosure, the pillar garnish is formed in a substantial U-shape that opens toward the vehicle outer side, as seen in a plan sectional view. Accordingly, narrowing of the pillar is devised, as compared with a case in which the pillar garnish is not formed in a substantial U-shape that opens toward the vehicle outer side as seen in a plan sectional view.

As described above, in accordance with the present disclosure, narrowing of a pillar can be devised.

BRIEF DESCRIPTION OF THE DRAWINGS

Exemplary embodiments of the present disclosure will be described in detail based on the following figures, wherein.

DETAILED DESCRIPTION

An embodiment relating to the present disclosure is described in detail hereinafter on the basis of the drawings. Note that, for convenience of explanation, arrow UP that is shown appropriately in the respective drawings indicates the vehicle upward direction, arrow FR indicates the vehicle forward direction, and arrow RH indicates the vehicle rightward direction. Accordingly, when vertical, longitudinal, and left-right directions are used in the following explanation, they refer to the vertical of the vehicle vertical direction, the longitudinal of the vehicle longitudinal direction, and the left and the right of the vehicle left-right direction (the vehicle transverse direction), unless otherwise specified.

Figure 1:
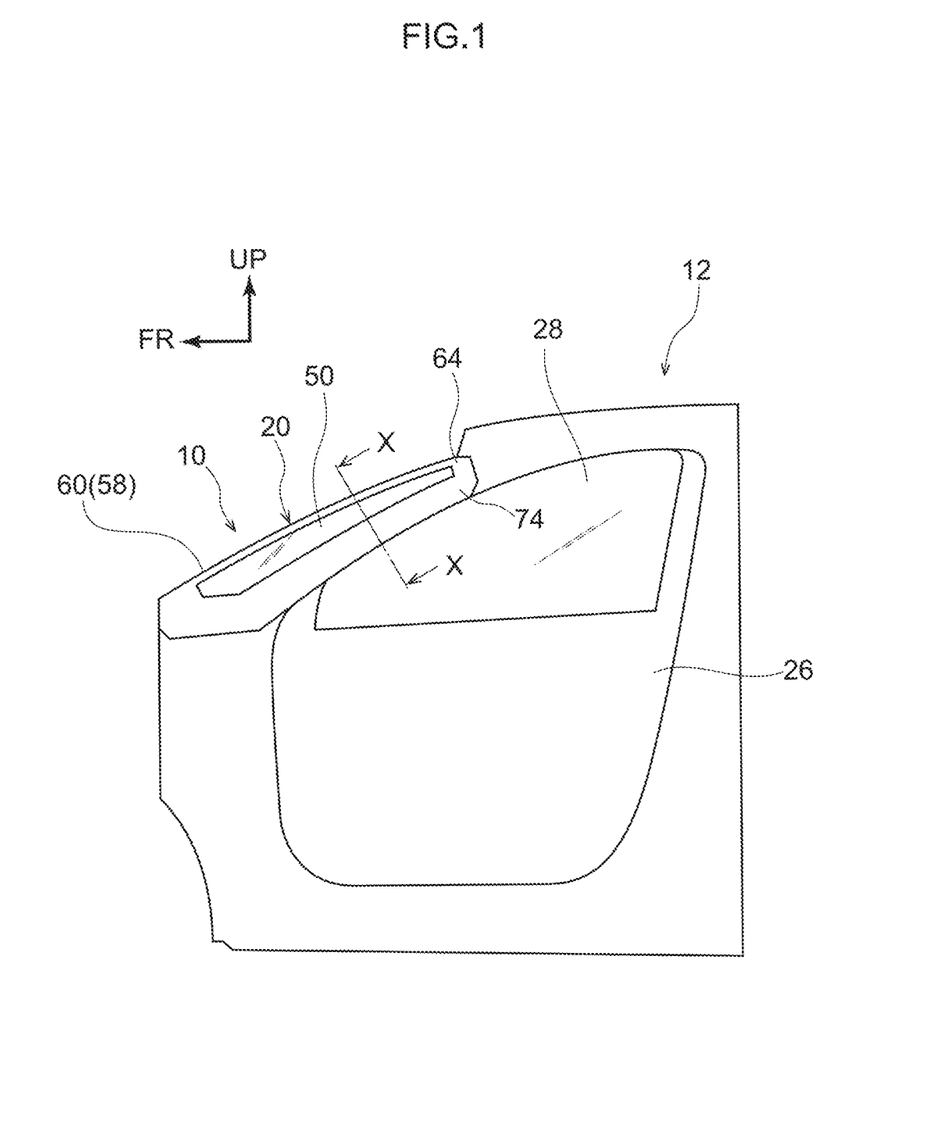
FIG. 1 is a side view showing an A pillar that has a pillar structure for a vehicle relating to a present embodiment.
Figure 2:
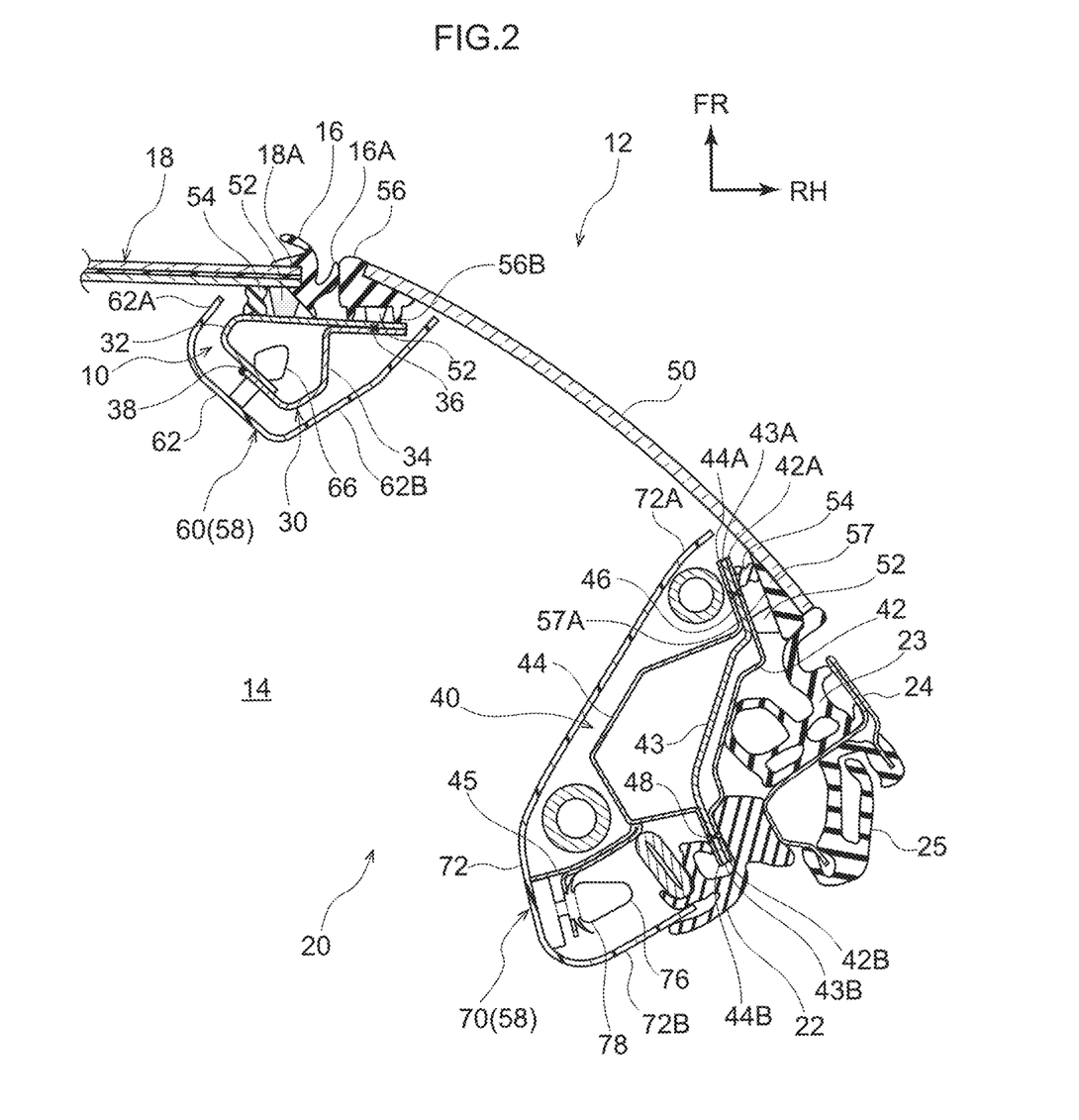
FIG. 2 is a cross-sectional view seen in the direction of arrow X-X of FIG. 1 and showing the pillar structure for a vehicle relating to the present embodiment.

As shown in FIG. 2, a front windshield glass (hereinafter called "front glass") 18, which is inclined toward the vehicle rear side while heading toward the vehicle upper side and separates an inner side of a vehicle cabin 14 and an outer side of the vehicle cabin 14, is provided at a vehicle 12. Further, as shown in FIG. 1, a pair of left and right front pillars (hereinafter called "A pillars") 20, to which a pillar structure 10 for a vehicle relating to the present embodiment is applied, are provided at the vehicle transverse direction outer sides of the front glass 18 and at the vehicle front sides of front side windows 28 of front doors 26.

Each of the pair of left and right A pillars 20 extends along a vehicle transverse direction outer side end portion 18A of the front glass 18 (see FIG. 2) with the length direction thereof being the substantially vehicle vertical direction. Namely, the pair of left and right A pillars 20 are respectively inclined toward the vehicle rear side while heading toward the vehicle upper side. Note that, because the A pillars 20 have the same structures but are symmetrical at the left side (e.g., the front passenger's seat side) and the right side (e.g., the driver's seat side), the A pillar 20 that is at the right side is described hereinafter.

Figure 3:
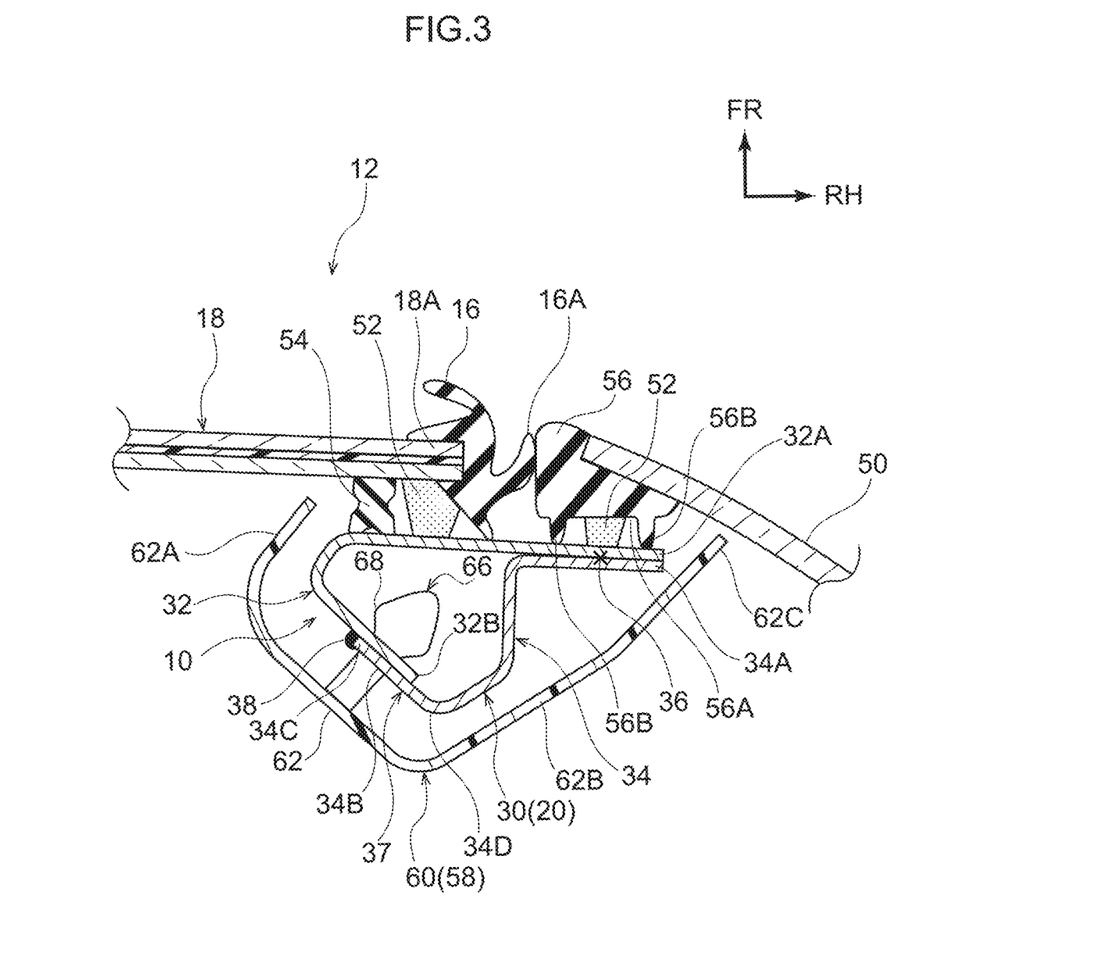
FIG. 3 is a partial enlarged sectional view of FIG. 2, and shows the pillar structure for a vehicle relating to the present embodiment.

As shown in FIG. 2, the A pillar 20 has a front column 30 that serves as a front side pillar frame member, and a rear column 40 that serves as a rear side pillar frame member. The front column 30 extends substantially along the vehicle vertical direction. As shown in FIG. 3, the vehicle transverse direction outer side end portion 18A of the front glass 18 is joined to the front column 30 via a urethane adhesive 52 and a cushioning rubber 54.

Further, the front column 30 is structured to include a front side pillar outer panel 32 that is made of a steel plate and serves as a first member, and a front side pillar inner panel 34 that is made of a steel plate and serves as a second member. The cross-sectional shape, which is orthogonal to the length direction (the direction of extending along the substantially vehicle vertical direction), of the front side pillar outer panel 32 is formed in a substantial C-shape. The cross-sectional shape, which is orthogonal to the length direction (the direction of extending along the substantially vehicle vertical direction), of the front side pillar inner panel 34 is formed in a substantial S-shape. Note that a ridgeline portion (corner portion) 34D that runs along the length direction is formed at the vehicle rear side of the front side pillar inner panel 34.

A closed cross-sectional shape is formed by the front side pillar outer panel 32 and the front side pillar inner panel 34. Namely, the front side pillar inner panel 34 is provided so as to face the substantially vehicle rear side of the front side pillar outer panel 32, and the front side pillar outer panel 32 and the front side pillar inner panel 34 are joined by spot welding and linear welding.

In further detail, an outer side flange portion 32A that is the vehicle transverse direction outer side end portion of the front side pillar outer panel 32, and an outer side flange portion 34A that is the vehicle transverse direction outer side end portion of the front side pillar inner panel 34, are superposed on one another, and this superposed portion is spot welded. Namely, plural spot welded portions 36 are formed at the outer side flange portion 32A and the outer side flange portion 34A at a predetermined interval (intermittently) in the length directions thereof.

Figure 4:
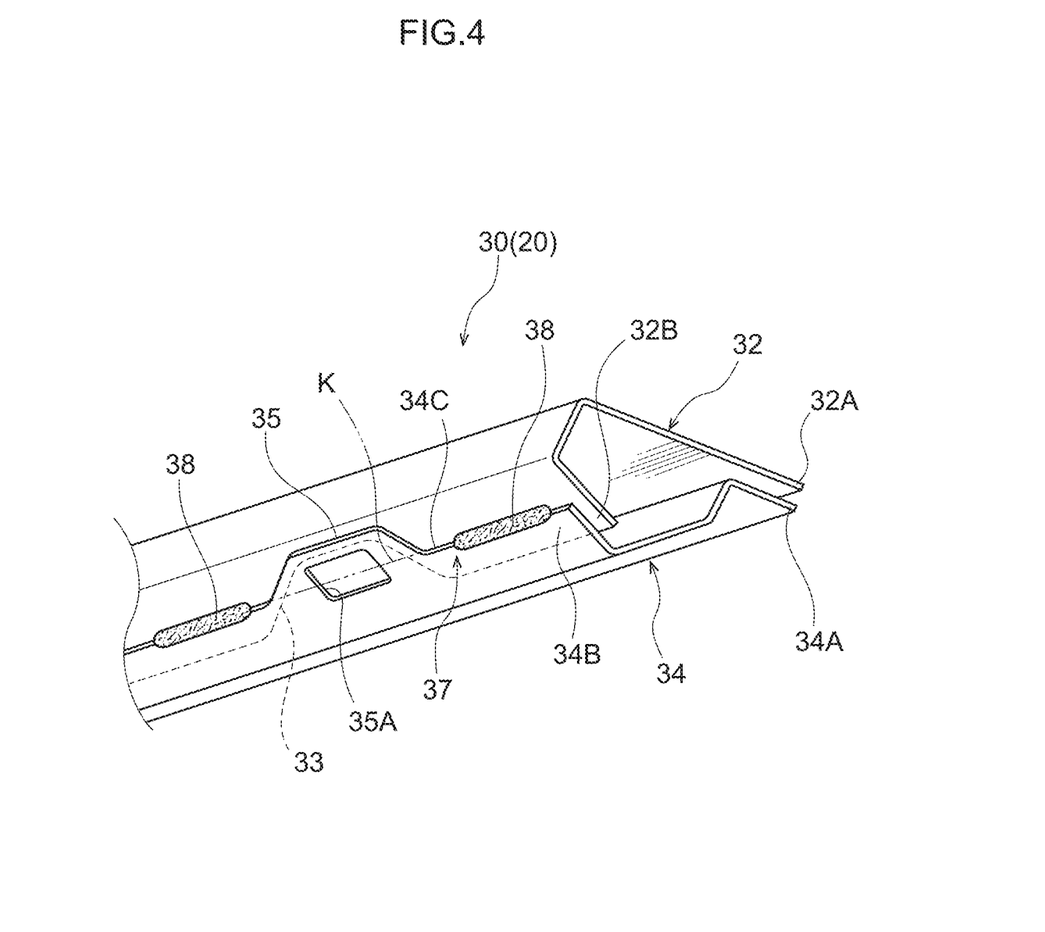
FIG. 4 is a perspective view showing a front column that structures the pillar structure for a vehicle relating to the present embodiment.

On the other hand, as shown in FIG. 3 and FIG. 4, an inner side flange portion 32B, which is the vehicle transverse direction inner side end portion of the front side pillar outer panel 32 and faces toward the vehicle cabin 14 side, and an inner side flange portion 34B, which is the vehicle transverse direction inner side end portion of the front side pillar inner panel 34 and faces toward the vehicle cabin 14 side, are superposed on one another, and this superposed portion is superposed portion 37.

An edge end portion 34C of the inner side flange portion 34B is welded in a linear form to the inner side flange portion 32B. Namely, plural linearly welded portions 38 are formed at the inner side flange portion 32B and the inner side flange portion 34B at a predetermined interval (intermittently) in the length directions thereof. Note that arc welding, laser welding and the like are examples of the means for welding the inner side flange portion 32B and the inner side flange portion 34B in a linear form.

As shown in FIG. 2, the rear column 40 is disposed substantially at the vehicle rear side of the front column 30. In other words, the rear column 40 is disposed so as to be apart from the front column 30 by a predetermined interval in the substantially vehicle longitudinal direction. The rear column 40 extends substantially parallel to the front column 30 (substantially along the vehicle vertical direction).

The rear column 40 is structured to include a rear side pillar outer panel 42 that is made of a steel plate, a rear side pillar reinforcement 43 that is made of a steel plate, and a rear side pillar inner panel 44 that is made of a steel plate. The rear side pillar outer panel 42 and the rear side pillar reinforcement 43 are formed substantially in the shapes of flat plates. The cross-sectional shape, which is orthogonal to the length direction (the extending direction that runs substantially along the vehicle vertical direction), of the rear side pillar inner panel 44 is formed in a substantial hat shape.

A closed cross-sectional shape is formed by the rear side pillar outer panel 42, the rear side pillar reinforcement 43 and the rear side pillar inner panel 44. Namely, the rear side pillar reinforcement 43 and the rear side pillar inner panel 44 are provided so as to face one another at the substantially vehicle transverse direction inner side of the rear side pillar outer panel 42. The rear side pillar outer panel 42, the rear side pillar reinforcement 43 and the rear side pillar inner panel 44 are joined by spot welding.

In further detail, a front side flange portion 42A that is the vehicle front side end portion of the rear side pillar outer panel 42, a front side flange portion 43A that is the vehicle front side end portion of the rear side pillar reinforcement 43, and a front side flange portion 44A that is the vehicle front side end portion of the rear side pillar inner panel 44 are superposed on one another, and this superposed portion is spot welded. Namely, plural spot welded portions 46 are formed at the front side flange portion 42A, the front side flange portion 43A and the front side flange portion 44A at a predetermined interval along the length directions thereof.

Further, a rear side flange portion 42B that is the vehicle rear side end portion of the rear side pillar outer panel 42, a rear side flange portion 43B that is the vehicle rear side end portion of the rear side pillar reinforcement 43, and a rear side flange portion 44B that is the vehicle rear side end portion of the rear side pillar inner panel 44 are superposed on one another, and this superposed portion is spot welded.

Namely, plural spot welded portions 48 are formed as well at the rear side flange portion 42B, the rear side flange portion 43B and the rear side flange portion 44B at a predetermined interval in the length directions thereof. Note that an opening weatherstrip 22 that is made of resin (made of rubber) is mounted, by being fit-together substantially from the vehicle rear side, to the rear side flange portion 42B, the rear side flange portion 43B and the rear side flange portion 44B that are superposed together.

An A pillar glass 50 that serves as a transparent member spans between the front column 30 and the rear column 40 via pillar glass moldings 56, 57 that are described later, the cushioning rubbers 54 and the urethane adhesives 52. Note that the A pillar glass 50 is a window member that is transparent and whose plate thickness direction is the substantially vehicle transverse direction, and is inclined toward the vehicle rear side while heading toward the vehicle upper side as seen in a side view (see FIG. 1).

As shown in FIG. 3, the pillar glass molding 56, which is made of resin (made of rubber) and is, as seen in a plan view, substantially shaped as a right triangle whose right angle portion is disposed at the vehicle transverse direction inner side and the vehicle rear side, is mounted integrally to the front end portion of the A pillar glass 50. Projecting portions 56B for positioning are formed integrally with the left and right both sides of a wall surface 56A, which faces the vehicle cabin 14 side, of the pillar glass molding 56. The urethane adhesive 52 is mounted between the projecting portions 56B.

As shown in FIG. 2, the pillar glass molding 57, which is made of resin (made of rubber) and is, as seen in a plan view, substantially shaped as a right triangle whose right angle portion is disposed at the vehicle transverse direction outer side and the vehicle rear side, is mounted integrally to the rear end portion of the A pillar glass 50. The urethane adhesive 52 is mounted to the vehicle rear side of a wall surface 57A, which faces the vehicle cabin 14 side, of the pillar glass molding 57. The cushioning rubber 54 is mounted to the vehicle front side of this wall surface 57A.

Accordingly, the front end portion of the A pillar glass 50 is mounted to the front column 30 due to the pillar glass molding 56 being joined by the urethane adhesive 52 to the outer side flange portion 32A from the vehicle front side while being positioned by the projecting portions 56B. Then, the rear end portion of the A pillar glass 50 is mounted to the rear column 40 due to the pillar glass molding 57 being joined by the urethane adhesive 52 to the front side flange portion 42A from the vehicle transverse direction outer side while being positioned by the cushioning rubber 54.

As shown in FIG. 2 and FIG. 3, a molding 16 that is made of resin (made of rubber) and serves as a sealing member is provided at the vehicle transverse direction outer side end portion 18A of the front glass 18 by being fit-together therewith from the vehicle transverse direction outer side. A vehicle transverse direction outer side end portion 16A of this molding 16 is made to abut the pillar glass molding 56 in an elastically deformed state (at a predetermined pressure). Namely, rainwater and the like are prevented from penetrating-in between the A pillar glass 50 and the front glass 18 by the molding 16 that is provided between the pillar glass molding 56 and the vehicle transverse direction outer side end portion 18A of the front glass 18.

As shown in FIG. 2, a door frame 24 of the front door 26 is disposed at the vehicle transverse direction outer side of the rear side pillar outer panel 42. A door weatherstrip 23 is provided at the vehicle front side of the door frame 24. A glass run 25 is provided at the vehicle rear side of the door frame 24. Note that the A pillar glass 50 is not limited to glass, and may be structured by, for example, a fiber reinforced resin that is transparent, or the like.

As shown in FIG. 2 and FIG. 3, an A pillar garnish 58 is provided at the vehicle transverse direction inner sides of the front column 30 and the rear column 40. The A pillar garnish 58 is made of resin, and is structured to include a front side pillar garnish 60 that is provided at the vehicle cabin 14 side of the front column 30, and a rear side pillar garnish 70 that is provided at the vehicle cabin 14 side of the rear column 40.

The front side pillar garnish 60 has a main body portion 62 that extends substantially in the vehicle vertical direction along the front column 30, and an extension portion 64 (see FIG. 1) that is provided integrally with the upper end portion of the main body portion 62 and extends substantially toward the vehicle rear side. The lower end portion of the main body portion 62 is inserted in an insertion hole (not shown) that is formed in an instrument panel (not shown), and the upper end portion of the extension portion 64 abuts a roof head liner (not shown).

As shown in FIG. 3, the cross-sectional shape, orthogonal to the length direction (i.e., as seen in a plan sectional view), of the main body portion 62 of the front side pillar garnish 60 is formed in a substantial U-shape that opens substantially toward the vehicle transverse direction outer side. The main body portion 62 covers, from the vehicle cabin 14 side and in a non-contacting state, the front column 30 (the inner side flange portion 32B of the front side pillar outer panel 32, the inner side flange portion 34B of the front side pillar inner panel 34, and the outer side flange portions 32A, 34A).

Note that, in the plan sectional view shown in FIG. 3, a side wall portion 62B, which is at the rear side and faces the front side pillar inner panel 34, of the main body portion 62 is formed to be longer than a side wall portion 62A which is at the front side and faces the front side pillar outer panel 32. A distal end portion 62C of the side wall portion 62B is bent slightly toward the vehicle front side.

Figure 5:
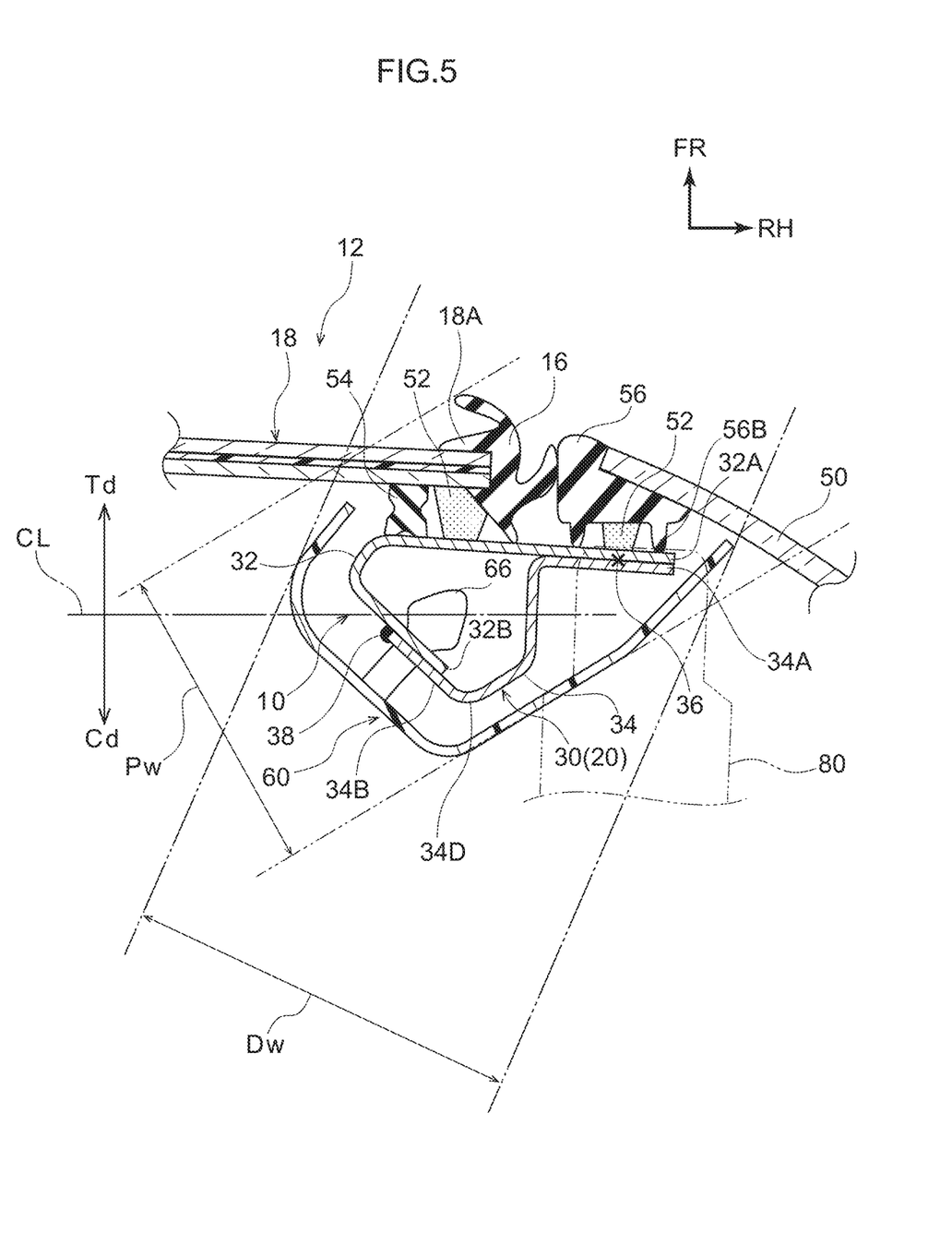
FIG. 5 is a cross-sectional view that corresponds to FIG. 3 and is for explaining operation of the pillar structure for a vehicle relating to the present embodiment.

Namely, the distal end portion 62C of the side wall portion 62B is disposed so as to be adjacent to the outer side flange portion 32A and the outer side flange portion 34A. Due thereto, as shown in FIG. 5, dead angle Dw, which arises due to the front side pillar garnish 60 when viewing from the driver's seat, is less than or equal to a distance between the centers of the pupils. Moreover, dead angle Pw, which arises due to the front side pillar garnish 60 when viewing from the front passenger's seat side, also is less than or equal to the distance between the centers of the pupils.

Note that "distance between the centers of the pupils" is the distance between the center of the pupil of the right eye and the center of the pupil of the left eye of the driver who is seated in a seat (not shown), and, for example, is approximately 60 to 65 mm for a Japanese adult. In the present embodiment, the distance between the centers of the pupils is set to "65 mm" as an example.

Further, plural clips 66, which are substantially shaped as arrows and which have enlarged diameter portions 68 at the distal end sides thereof, are provided at the inner surface of the main body portion 62 along the length direction of the main body portion 62 with a predetermined interval therebetween. These clips 66 (enlarged diameter portions 68) that serve as anchor members are formed so as to be able to deform elastically in directions orthogonal to the projecting directions thereof, and are provided at an inner surface (a wall surface) of the main body portion 62 so as to project outward so as to be able to face the inner side flange portion 34B of the front side pillar inner panel 34 and the inner side flange portion 32B of the front side pillar outer panel 32.

Further, as shown in FIG. 4, overhanging portions 35, which jut outward substantially toward the vehicle front side from the edge end portion 34C, are formed at the inner side flange portion 34B of the front side pillar inner panel 34. Through-holes 35A that are rectangular are formed in the overhanging portions 35. In the inner side flange portion 32B of the front side pillar outer panel 32, through-holes that communicate with the through-holes 35A are not formed, but cut-out portions 33 that are cut-out substantially along the shapes of the overhanging portions 35 are formed.

The through-holes 35A are formed between the linearly welded portions 38, and are formed on an imaginary extension line K that connects the linearly welded portions 38 together. (The imaginary extension line K passes-through the centers of the through-holes 35A.) The inner diameter of the through-hole 35A is formed to be slightly smaller than the outer diameter of the enlarged diameter portion 68. Accordingly, the front side pillar garnish 60 is mounted to the front column 30 due to the enlarged diameter portions 68 of the clips 66 being inserted in the through-holes 35A while being elastically deformed, and thereafter, the enlarged diameter portions 68 being restored.

As shown in FIG. 2, the rear side pillar garnish 70 has a main body portion 72 that extends substantially in the vehicle vertical direction along the rear column 40, and an extension portion 74 (see FIG. 1) that is provided integrally with the upper end portion of the main body portion 72 and extends substantially toward the vehicle rear side. In the same way as at the front side pillar garnish 60, the lower end portion of the main body portion 72 is inserted in an insertion hole that is formed in the instrument panel, and the upper end portion of the extension portion 74 abuts the roof head liner.

The cross-sectional shape, orthogonal to the length direction (i.e., as seen in a plan sectional view), of the main body portion 72 of the rear side pillar garnish 70 is formed in a substantial U-shape that opens substantially toward the vehicle transverse direction outer side. The main body portion 72 covers the rear column 40 from the vehicle cabin 14 side and in a non-contacting state. Note that, in the plan sectional view shown in FIG. 2, a side wall portion 72A, which is at the front side and faces the rear side pillar inner panel 44, of the main body portion 72 is formed to be longer than a side wall portion 72B that is at the rear side.

Further, plural clips 76, which are substantially shaped as arrows and which have enlarged diameter portions 78 at the distal end sides thereof, are provided at the inner surface of the rear side pillar garnish 70 along the length direction of the main body portion 72 with a predetermined interval therebetween. These clips 76 (enlarged diameter portions 78) also are formed so as to be able to deform elastically in directions orthogonal to the projecting directions thereof, and are provided at an inner surface (a wall surface) of the main body portion 72 so as to project outward so as to be able to face a supporting portion 45 that is provided integrally with the rear side pillar inner panel 44.

Through-holes (not illustrated), which are rectangular and are slightly smaller than the outer diameters of the enlarged diameter portions 78, are formed in the supporting portion 45 that is provided integrally with the rear side pillar inner panel 44. Accordingly, the rear side pillar garnish 70 is mounted to the rear column 40 due to the enlarged diameter portions 78 of the clips 76 being inserted in the through-holes while being elastically deformed, and thereafter, the enlarged diameter portions 78 being restored.

Operation of the pillar structure 10 for a vehicle, which relates to the present embodiment and is structured as described above, is described next.

As shown in FIG. 3 and FIG. 4, the superposed portion 37 that is flat is formed by the inner side flange portion 34B of the front side pillar inner panel 34 being superposed on the inner side flange portion 32B of the front side pillar outer panel 32. Then, the linearly welded portions 38 are formed due to the edge end portion 34C of the inner side flange portion 34B being welded in a linear form to the inner side flange portion 32B.

Further, the front side pillar garnish 60, which covers the front column 30 (the inner side flange portions 32B, 34B and the outer side flange portions 32A, 34A) from the vehicle cabin 14 side, is formed in a substantial U-shape that opens toward the vehicle outer side as seen in a plan sectional view. The clips 66 that are provided at an inner surface of the main body portion 62 of the front side pillar garnish 60 so as to project outward are mounted to the front column 30 by being inserted in the through-holes 35A that are formed in the inner side flange portion 34B.

Namely, the linearly welded portions 38 and the superposed portion 37 of the inner side flange portion 32B and the inner side flange portion 34B, and the through-holes 35A that are the portions to which the clips 66 are assembled, are provided at the same flat surface side. Accordingly, as compared with a case in which the inner side flange portion 32B and the inner side flange portion 34B are not superposed together, and further, the through-holes 35A are not formed in the inner side flange portion 34B (a case in which through-holes for assembly are formed in other than the inner side flange portion 34B or the inner side flange portion 32B), as seen from the length direction of the A pillar 20, the distances between the linearly welded portions 38 and the through-holes 35A in the direction orthogonal to this length direction can be made shorter.

Accordingly, optimization of the assembly space of the front side pillar garnish 60 at the front column 30 (space saving) can be devised, and narrowing of the front column 30 can be devised. Namely, as a result, narrowing of the A pillar 20 can be devised, and the dead angle Dw, which arises due to the front side pillar garnish 60 when viewing from the driver's seat, and the dead angle Pw, which arises due to the front side pillar garnish 60 when viewing from the front passenger's seat, can be reduced well (can be made to be less than or equal to the distance between the centers of the pupils).

As seen in a plan sectional view, the front side pillar garnish 60 is formed in a substantial U-shape that opens toward the vehicle outer side. Therefore, as compared with a case in which the front side pillar garnish is not formed in a substantial U-shape that opens toward the vehicle outer side, narrowing of the front side pillar garnish 60 itself also can be devised. Accordingly, narrowing of the A pillar 20 can be devised more.

Further, the linearly welded portions 38 are formed intermittently, and the through-holes 35A are formed between the linearly welded portions 38. Accordingly, as compared with a case in which the through-holes 35A are not formed between the linearly welded portions 38 that are formed intermittently, as seen from the length direction of the A pillar 20, the distances between the linearly welded portions 38 and the through-holes 35A in the direction orthogonal to this length direction can be shortened. Accordingly, narrowing of the front column 30 can be promoted.

Moreover, the overhanging portions 35 that jut outward from the edge end portion 34C are formed at the inner side flange portion 34B between the linearly welded portions 38, and the through-holes 35A are formed in these overhanging portions 35. Accordingly, as compared with a case in which the overhanging portions 35 are not formed at the edge end portion 34C of the inner side flange portion 34B between the linearly welded portions 38, the distances between the linearly welded portions 38 and the through-holes 35A in the direction orthogonal to the length direction of the A pillar 20 can be shortened more.

Further, the through-holes 35A are formed on the imaginary extension line K that connects the linearly welded portions 38 together. Accordingly, as compared with a case in which the through-holes 35A are formed at positions apart from the imaginary extension line K that connects the linearly welded portions 38 together, the distances between the linearly welded portions 38 and the through-holes 35A in the direction orthogonal to the length direction of the A pillar 20 can be shortened even more. Accordingly, narrowing of the front column 30 can be further promoted.

Further, when load is applied to the A pillar 20 from the vehicle front side, the front column 30 starts to bendingly deform toward the vehicle rear side. Namely, the portion that is further toward the vehicle front side than a central axis CL that is shown by the one-dot chain line in FIG. 5 is tensilely deformed (is tensile deformation Td side), and the portion at the vehicle rear side is compressively deformed (is compressive deformation Cd side).

However, as shown in FIG. 5, the ridgeline portion 34D that extends in the length direction of the front side pillar inner panel 34 is disposed at the rear portion side that is the compressive deformation Cd side of the front column 30. Accordingly, at the rear portion of the front column 30, there is yield strength with respect to the compressive deformation. Accordingly, this compressive deformation can be suppressed.

Further, the outer side flange portion 32A and the outer side flange portion 34A are joined by spot welding, and the outer side flange portion 32A and the outer side flange portion 34A are formed so as to jut outward toward the vehicle transverse direction outer side. Therefore, a space for inserting a welding gun 80 (see FIG. 5) can be easily ensured. Accordingly, the welding of the outer side flange portion 32A and the outer side flange portion 34A can be facilitated.

The inner side flange portion 32B and the inner side flange portion 34B are welded in a linear form (a structure that has the linearly welded portions 38), and the outer side flange portion 32A and the outer side flange portion 34A are joined by spot welding (a structure having the spot welded portions 36). Therefore, the amount of heat inputted to the front column 30 can be reduced, as compared with a case in which the outer side flange portion 32A and the outer side flange portion 34A are welded linearly. Accordingly, the occurrence of distortion due to heating at the front column 30 can be suppressed or prevented.

Further, the A pillar 20 relating to the present embodiment has the A pillar glass 50 that is transparent. Therefore, the driver (vehicle occupant) can view the situation at the outer side of the A pillar 20 via the A pillar glass 50 from between the front side pillar garnish 60 (the front column 30) and the rear side pillar garnish 70 (the rear column 40).

Figure 6:
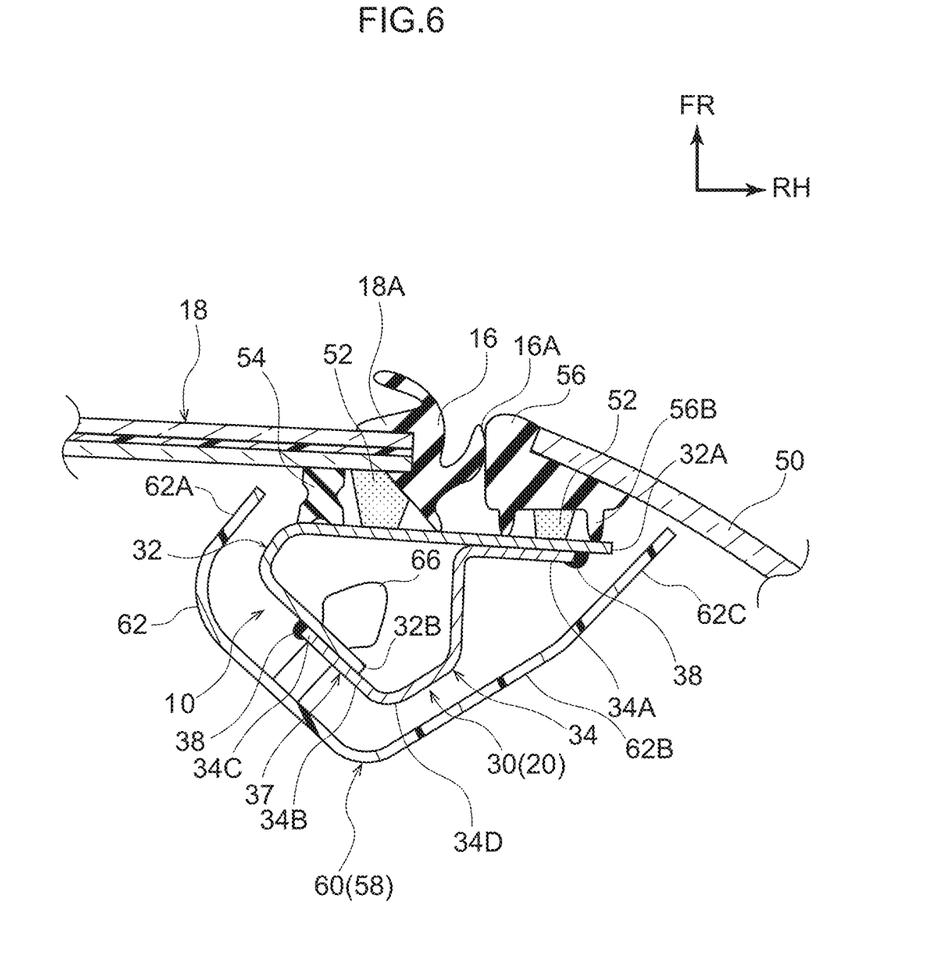
FIG. 6 is a cross-sectional view that corresponds to FIG. 3 and shows a modified example of the pillar structure for a vehicle relating to the present embodiment.

Note that, as shown in FIG. 6, at the front column 30, the outer side flange portion 32A of the front side pillar outer panel 32 and the outer side flange portion 34A of the front side pillar inner panel 34 may be joined in a linear form by arc welding or laser welding or the like. Namely, the outer side flange portion 32A and the outer side flange portion 34A may be joined by the plural linearly welded portions 38.

In this case, the closed cross-sectional shape of the front column 30 can be made to be larger than the closed cross-sectional shape of the front column 30 that is shown in FIG. 3. Therefore, there is the advantage that the rigidity of the front column 30 can be improved. However, in this case, because the amount of heat that is inputted to the front column 30 increases as described above, there is the disadvantage that it is easy for distortion by heating to arise at the front column 30.

Although the pillar structure 10 for a vehicle relating to the present embodiment has been described on the basis of the drawings, the pillar structure 10 for a vehicle relating to the present embodiment is not limited to the illustrated structure, and the design thereof can be changed appropriately within a scope that does not depart from the gist of the present disclosure. For example, there may be a structure in which the cut-out portions 33 are not formed in the inner side flange portion 32B, and through-holes (not illustrated) that communicate with the through-holes 35A are formed.

What is claimed is:

1. A pillar structure for a vehicle, comprising:

a pillar frame member having a superposed portion, at which a second wall portion, which faces a vehicle cabin side, of a second member that extends in a length direction of a pillar, is superposed on a first wall portion with an overhanging portion, which faces the vehicle cabin side, of a first member that extends in the length direction of the pillar, and having intermittent linearly welded portions that are formed by an edge end portion of the second wall portion being linearly welded to the first wall portion at either side of the overhanging portion; and a pillar garnish that is mounted to the second wall portion, and that covers the first wall portion and the second wall portion from the vehicle cabin side.

2. The pillar structure for a vehicle of claim 1, wherein:

anchor members are provided so as to project outward from a wall surface of the pillar garnish, the wall surface facing the first wall portion and the second wall portion, and the pillar garnish is mounted to the second wall portion by the anchor members being inserted into through-holes that are formed in the second wall portion.

3. The pillar structure for a vehicle of claim 2, wherein:

the through-holes are formed between the intermittent linearly welded portions.

4. The pillar structure for a vehicle of claim 3, wherein:

multiple overhanging portions that jut outward from the edge end portion are formed at the second wall portion between the intermittent linearly welded portions, and the through-holes are formed in the overhanging portions.

5. The pillar structure for a vehicle of claim 3, wherein the through-holes are formed on an extension line that connects the intermittent linearly welded portions.

6. The pillar structure for a vehicle of claim 1, wherein, as seen in a plan sectional view, the pillar garnish is formed in a substantial U-shape that opens toward a vehicle outer side.

7. The pillar structure for a vehicle of claim 1, further comprising other linearly welded portions at which an outer side flange portion of the first member and an outer side flange portion of the second member are welded in a linear form.

* * * * *